Sept. 15, 1931.  O. DALKE  1,823,133
COTTON HARVESTER
Filed April 19, 1928   3 Sheets-Sheet 1
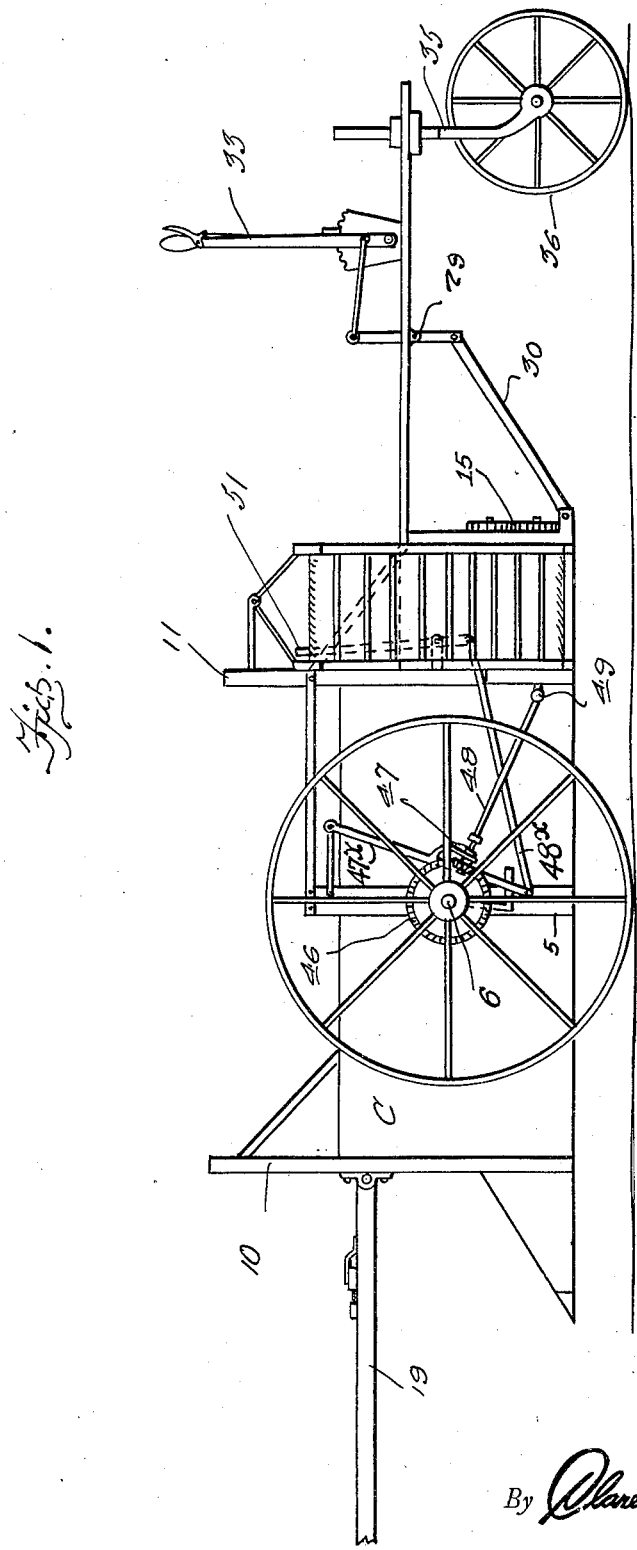
Inventor
Otto Dalke
By Clarence A. O'Brien
Attorney

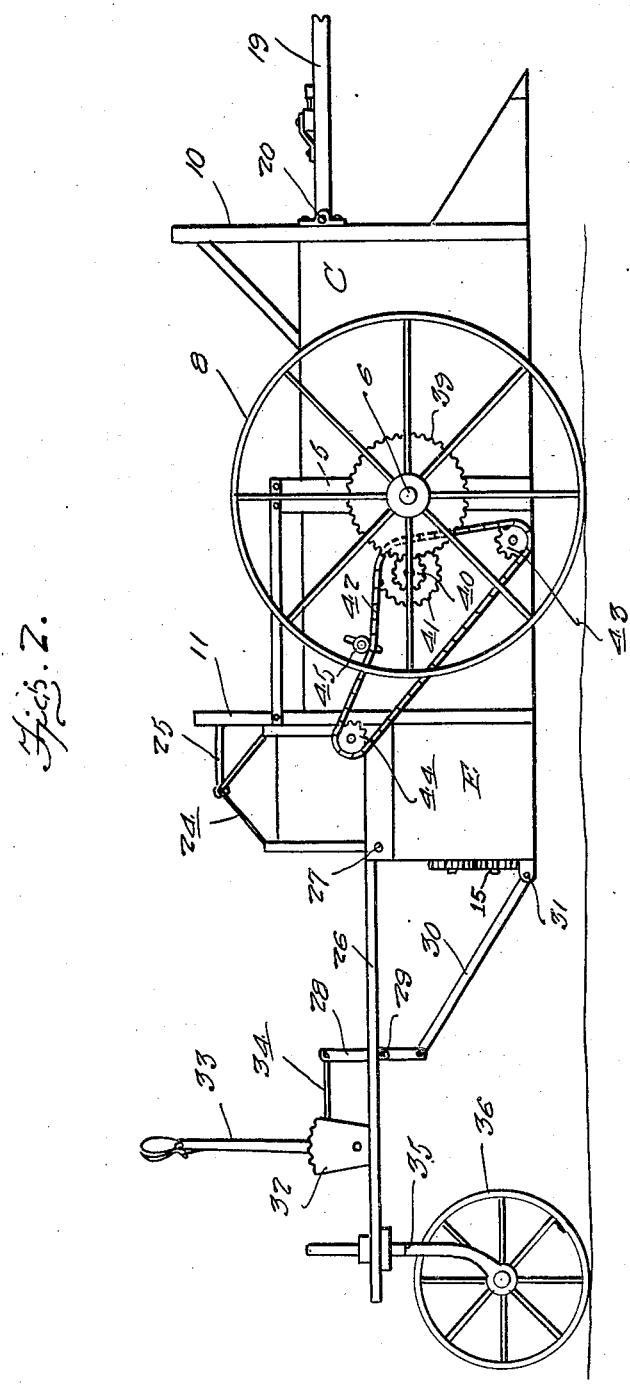

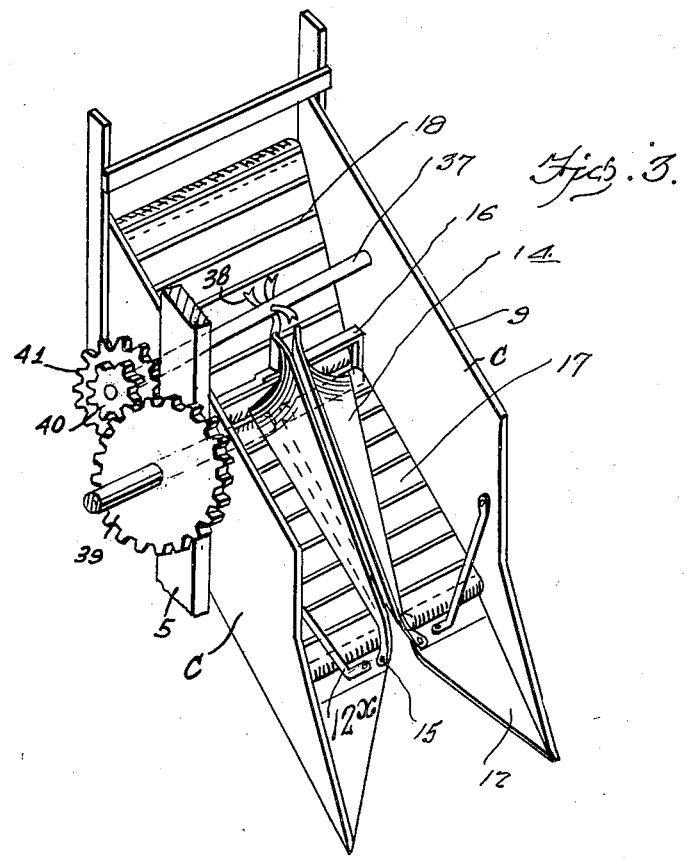
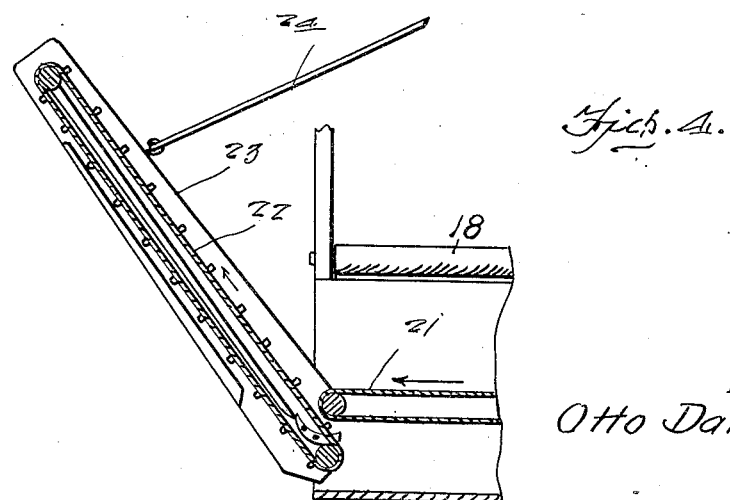

Patented Sept. 15, 1931

1,823,133

UNITED STATES PATENT OFFICE

OTTO DALKE, OF HYDRO, OKLAHOMA, ASSIGNOR OF TWO-THIRDS TO J. W. GLASS AND C. E. FROST

COTTON HARVESTER

Application filed April 19, 1928. Serial No. 271,252.

My invention pertains to cotton harvesters, and contemplates the provision of a simple, compact and efficient apparatus adapted to be moved along a row of cotton plants after a frost and when the cotton bolls are open, and so equipped that incident to forward movement of the apparatus the bolls will be pulled from their stalks and conveyed to a point of discharge from the apparatus.

To the attainment of the foregoing the invention consists in the improvement as hereinafter described and definitely claimed.

In the accompanying drawings, forming part of this specification:

Figure 1 is a side elevation of the harvester embodying the features of my invention, Figure 2 is another side elevation thereof opposite to that shown in Figure 1, Figure 3 is a perspective of the box like casing and parts associated therewith, and Figure 4 is a vertical detail transverse section showing the loading elevator and a portion of the transverse conveyor which delivers the bolls to the elevator.

Referring to the drawings in detail it will be seen that a frame 5 which is vertically disposed has journalled therein an axle 6 on which are fixed wheels 8. A box like casing C is carried in the frame 5 extending forwardly and rearwardly therefrom and includes a pair of sides 9, a front frame 10 and a rear frame 11. Guide fingers 12 project forwardly from the casing C and have their adjacent edges diverging forwardly from each other and adapted to gather and raise laterally leaning stalks and guide them between the strippers presently explained.

Interposed between and fixed to the guide fingers 12 and the side walls 9 are braces 12$^x$, Figure 3.

Strippers 14 are attached to the rear ends of the fingers 12 as at 15 and to a transverse bracket or bar 16 in an intermediate portion of the casing. These strippers 14 extend longitudinally in spaced relation to each other and are curved transversely and taper in width forwardly.

A pair of endless conveyors 17 are mounted between the sides 9 one under each stripper 14. An endless elevator 18 is mounted in the rear portion of the casing between the sides 9 to receive cotton from the conveyors 17. A tongue structure 19 is hingedly engaged as at 20 with the front frame 10.

An extension E is disposed rearwardly on the rear frame 11 and has a transverse endless conveyor 21 mounted therein adapted to receive bolls from the elevator 18, and leading to an upwardly and laterally inclined endless elevator 22 mounted between the sides 23 and braced as at 24 from the upper portion of the frame 11 by an arm 25.

A beam 26 projects rearwardly from the extension E and is hingedly engaged as at 27 therewith. A lever 28 is pivoted intermediate its ends as at 29 to an intermediate portion of the beam and has a link 30 pivotally engaged with the lower end thereof and pivotally engaged with the bracket 31 on the bottom portion of the extension E. A rack bracket 32 is mounted on the beam and has a lever 33 rockable thereon with a link connection 34 with the upper end of the lever 28.

Obviously by adjusting the lever 33 the angle of the beam 26 may be changed with respect to the harvester for raising and lowering the front end thereof. The rear end of the beam is supported on a fork 35 having the wheel 36 engaged therewith. The fork 35 is rotatable in the standard to facilitate steering, as will be apparent.

A transverse shaft 37 is journaled between the sides and has fingers 38 projecting from the central portion thereof to disengage the cotton from the rear upper edge portions of the strippers 14. A gear 39 is fixed to the axle 6 and meshes with a pinion 40 connected to a sprocket 41 over which is trained a chain 42. This chain 42 is trained over sprockets 43 and 44. An adjustable tightener 45 is used to maintain the chain 42 in a taut state. The axle 6 carries the roller on which the conveyors 17 are arranged and serves to drive the said conveyors. The sprocket 44, engaged by the chain 42, is fixed on the shaft of the upper roller of the elevator 18 and serves to drive said elevator. The sprocket 41 is fixed to the shaft 37 bearing the fingers 38 and is also fixed to the pinion 40 in mesh with the gear 39, and from this it follows that the chain 42 will be driven from the axle 6.

The bolls removed from the stems by the stripper 14 incident to the forward traverse of the apparatus are received on the conveyors 17 and are delivered therefrom to the elevator 18 from which they are discharged to a transverse endless conveyor 21. Said conveyor 21 delivers the bolls to the before-described elevator 22. The said elevator 22 is driven from the axle 6 through a miter gear 46 fixed thereon, a beveled pinion 47 in mesh with said gear 46 and a shaft 48 bearing the pinion 47 and connected by an universal joint 49 to the lower shaft of the elevator 22 for the driving of the latter. The transverse conveyor 21 is driven by the train of gears 15 interposed between the lower shaft of the elevator 22 and the adjacent shaft of said conveyor 21. The pinion 27 is splined on and movable longitudinally of the shaft 48 and is adapted to be adjusted into and out of engagement with the gear 46 by a lever 47˟ which is engaged with the pinion 47 as shown. Manifestly when the gear 47 is disengaged from gear 46 the elevator 22 and the conveyor 21 will be stopped. The lever 47˟ is connected through a link 48˟ with the lower arm of a hand lever 51 within convenient reach of the operator of the apparatus.

Incident to the operation of the apparatus, the cotton stems or stalks are pushed down and drawn between the strippers 14 and are thereby removed from the stalks and guided by the side portions of the strippers to the conveyors 17.

As the bolls pass from the conveyors 17 to the elevator 18 and from the conveyor 21 to the elevator 22, dirt and sand drop from the cotton.

It is thought that the construction, operation and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a cotton harvester and in combination, forwardly extending, transversely-spaced guide fingers, having rearwardly converged inner side edges, longitudinal, transversely spaced endless conveyors arranged in rear of and in alignment with the rear portions of said guide fingers, upright walls at the outer sides of said guide fingers and endless conveyors, a transverse bar arranged between and carried by said walls, and longitudinal, transversely-spaced stripper plates tapered forwardly and having transversely curved side portions overhanging said conveyors, said stripper plates connected at their forward ends to said guide fingers and at their rear ends to said transverse bar.

2. In a cotton harvester and in combination, forwardly extending, transversely-spaced guide fingers, having rearwardly converged inner side edges, longitudinal, transversely spaced endless conveyors arranged in rear of and in alignment with the rear portions of said guide fingers, upright walls at the outer sides of said guide fingers and endless conveyors, a transverse bar arranged between and carried by said walls, and longitudinal, transversely-spaced stripper plates tapered forwardly and having transversely curved side portions overhanging said conveyors, said stripper plates connected at their forward ends to said guide fingers and at their rear ends to said transverse bar and defining an upwardly and rearwardly inclined stripping slot, rotary means mounted in and extending between said side walls and having fingers movable between the transversely-spaced stripper plates, a longitudinally arranged endless elevator arranged in rear of and adjacent to said spaced conveyors, a transverse endless conveyor arranged in rear of said elevator, and a lateral endless elevator arranged adjacent to the discharge portion of the transverse conveyor.

In testimony whereof I affix my signature.

OTTO DALKE.